US006362830B1

(12) United States Patent
Walraven

(10) Patent No.: US 6,362,830 B1
(45) Date of Patent: Mar. 26, 2002

(54) METHOD AND APPARATUS FOR COLOR DISPLAY WITH COLOR TRANSFORMATION TO IMPROVE PERCEPTION FOR PEOPLE WITH IMPAIRED COLOR SIGHT

(75) Inventor: Jan Walraven, Amersfoort (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 09/341,478

(22) PCT Filed: Nov. 9, 1998

(86) PCT No.: PCT/NL98/00648

§ 371 Date: Jul. 12, 1999

§ 102(e) Date: Jul. 12, 1999

(87) PCT Pub. No.: WO99/24964

PCT Pub. Date: May 20, 1999

(30) Foreign Application Priority Data

Nov. 12, 1997 (NL) ............................................ 1007531

(51) Int. Cl.[7] ............................ G09G 5/04; H04N 7/18
(52) U.S. Cl. ......................................... 345/600; 348/62
(58) Field of Search ................................ 345/150, 153, 345/600; 348/62; 382/167, 163

(56) References Cited

U.S. PATENT DOCUMENTS

| | | | | | |
|---|---|---|---|---|---|
| 5,668,890 | A | * | 9/1997 | Winkelman | 382/167 |
| 5,956,015 | A | * | 9/1999 | Hono | 345/153 |
| 5,991,511 | A | * | 11/1999 | Granger | 395/109 |
| 6,025,885 | A | * | 2/2000 | Deter | 348/661 |
| 6,160,576 | A | * | 12/2000 | Higuchi et al. | 348/62 |

OTHER PUBLICATIONS

"Image Enhancement for the Visually Impaired", R. Goldstein et al., Jul. 1991, Investigative Ophthalmology & Visual Science, vol. 32, No. 8, pp. 2337–2350.*

* cited by examiner

*Primary Examiner*—Jeffery Brier
*Assistant Examiner*—Ryan Yang
(74) *Attorney, Agent, or Firm*—Young & Thompson

(57) ABSTRACT

A method and equipment for displaying a computer generated color image on which a color transformation is carried out so that a person with normal color vision is able to perceive the colors in a way which corresponds to the perception of a person with abnormal color vision. Use is made of this in order, on the basis of the user's own perception, or on the basis of an expert system, to adjust colors such that these comply with a preset distinguishability criterion which is matched to the ability of the particular target group of users, including users with normal color vision, to distinguish colors.

13 Claims, 3 Drawing Sheets

METHOD AND APPARATUS FOR COLOR DISPLAY WITH COLOR TRANSFORMATION TO IMPROVE PERCEPTION FOR PEOPLE WITH IMPAIRED COLOR SIGHT

BACKGROUND OF THE INVENTION

The invention relates to a method and equipment for transforming the colours generated by an image display system, in accordance with the limitations which apply in respect of the perception of colours by people who have an abnormal form of colour vision, and the use thereof for adaptation of the colour palette in a manner such that the colours are easily distinguishable from one another for target groups having the relevant form of abnormal colour vision.

The invention relates in particular to a method and equipment for transforming the colours of computer-generated images on an image display system, such as, for example, a cathode ray tube or LCD screen (liquid crystal display).

DESCRIPTION OF THE RELATED ART

People who have an abnormal form of colour vision, approximately 8% of the male population and 0.5% of the female population, do not perceive the colours generated by an image display system in the standard manner. As a result certain functions of the image display system cannot be properly utilised by this group of the population. In this context consideration can be given, for example, to the perception of colour-coded information in computer applications, such as control panels for industrial processes and electronically generated geographical and topographical maps.

SUMMARY OF THE INVENTION

One aim of the present invention is to provide a method with which developers of computer software and designers of visual information systems are able to perceive the colours they use in a manner which corresponds to the colour perception of a person who has abnormal colour vision. A further aim of the present invention is to provide a method and equipment for transforming a set of colours in such a way that the differences between the colours comply with a pre-set distinguishability criterion, taking account of the ability of the user to distinguish colours, the various features being supported by a computational method by means of which the set of colours concerned can automatically be modified in accordance with the set distinguishability criterion.

To this end the method according to the invention is characterised in that a data entry unit, connected to the image display system, for storing digital colour specifications and system data in a colour memory unit and memory unit is provided, as well as a computing unit, connected to the data entry unit, for transformation of the digital colour specifications of at least one pixel, as a function of the entered colour abnormality data and colour processing commands, comprising the following steps:

a feeding of the digital colour specifications of the colour or set of colours to be transformed and of the colour abnormality and system data required for the transformation into the computing unit, b calculation, with the aid of the computing unit, of three primary physiological colour signals for an observer with normal colour vision, c calculation of a second set of three primary physiological colour signals for an observer with abnormal colour vision, as specified by the colour abnormality data, d calculation of three new digital colour specifications for generation of colours which generate the same primary physiological colour signals for an observer with normal colour vision as the colour signals calculated under c) for an observer with abnormal colour vision, e calculation of trichromatic components X, Y and Z in the CIE colour specification system which correspond to the new digital colour specifications, f assessment of the degree of colour difference in pairs of colours within the set of transformed colours, making use of calculations in accordance with colour difference equations which already exist or are still to be developed, g selecting those colour differences from the colour differences calculated under f) which do not meet a pre-set difference criterion and then modifying the colours concerned, optionally with the assistance of a computational method, such that said colours then comply with the set difference criterion.

With computer-generated colours the luminance levels of the primary colours are set by means of three colour-specific control signals. Each control signal is formed by an analog voltage originating from a digital-to-analog converter (DAC). An 8-bit DAC, with which analog control signals are determined as a function of the digital colour specifications, is frequently used. The digital colour specifications are described by three numerals, which determine the magnitude of the contributions of the three primary colours to the colours to be generated. Assuming the generally used primary colours red (R), green (G) and blue (B), said digital colour specifications are indicated here by numerical values $N_R$, $N_G$, and $N_B$ respectively. With an 8-bit DAC these numerals vary from 0 to 255, so that a maximum of $256^3$ different colours can be generated by combination of the three primary colours of the image display system. Sets of 64 or 256 different colours, which can be made up from a palette of the said $256^3$ colours, can usually be rendered visible simultaneously by an image display system.

The perception of colours by a person is initiated by absorption of light in three different types of photoreceptors, which are also referred to as the red, green and blue cones. The latter are mainly effective in the long wave, medium wave and short wave regions, respectively, of the visual spectrum, by means of spectral sensitivities $l(\lambda)$, $m(\lambda)$ and $s(\lambda)$ of the photopigments matched to said regions. The primary physiological colour signals L, M and S generated by the cones can be described as the integral of the product of the spectral sensitivities concerned and the radiance of the light generated by the image display system. Said radiance is determined by the digital colour specifications and the spectral distribution of the primary colours concerned plus the so-called gamma functions, which describe the relationship between the relative radiances of the primary colours $c_R$, $c_G$ and $c_B$ as a function of the respective digital colour specifications $N_R$, $N_G$ and $N_B$.

In the case of an abnormal form of colour vision it can be that there are not three but only two types of cones in the retina These so-called dichromats can be subdivided into protanopes, characterised by the lack of red cones (or L receptors), deuteranopes, characterised by the absence of green cones (or M receptors) and tritanopes, characterised by the absence of blue cones (or S receptors). It can also occur that two of the three types of cones have only very slight differences between them as far as their spectral sensitivity is concerned. In the case of the so-called anomalous trichromats, a distinction is made between protanomalopes, characterised by red cones having a spectral sensitivity l'(λ) which differs very little from that of the green cones, and deuteranomalopes, having a spectral sensitivity m'(λ) which differs very little from that of the red cones.

As yet little is known about the tritanomalopes, characterised by an abnormal S receptor system. It is possible that in this case there is merely a question of a reduced contribution by the S receptors, which can be described as a relative reduction in the number of S receptors compared with the numbers of L and M receptors. For the time being this assumption also forms the basis for the computational model used in the invention for simulation of persons who have a tritanomaly. This group, that is to say tritanomalopes and tritanopes together, is relatively small; estimates vary from 0.005 to 0.1% of the population.

The invention will be explained in more detail with reference to the appended drawing, consisting of three figures.

DESCRIPTION OF THE PREFERRED EMBODIMENT

Figure 1:
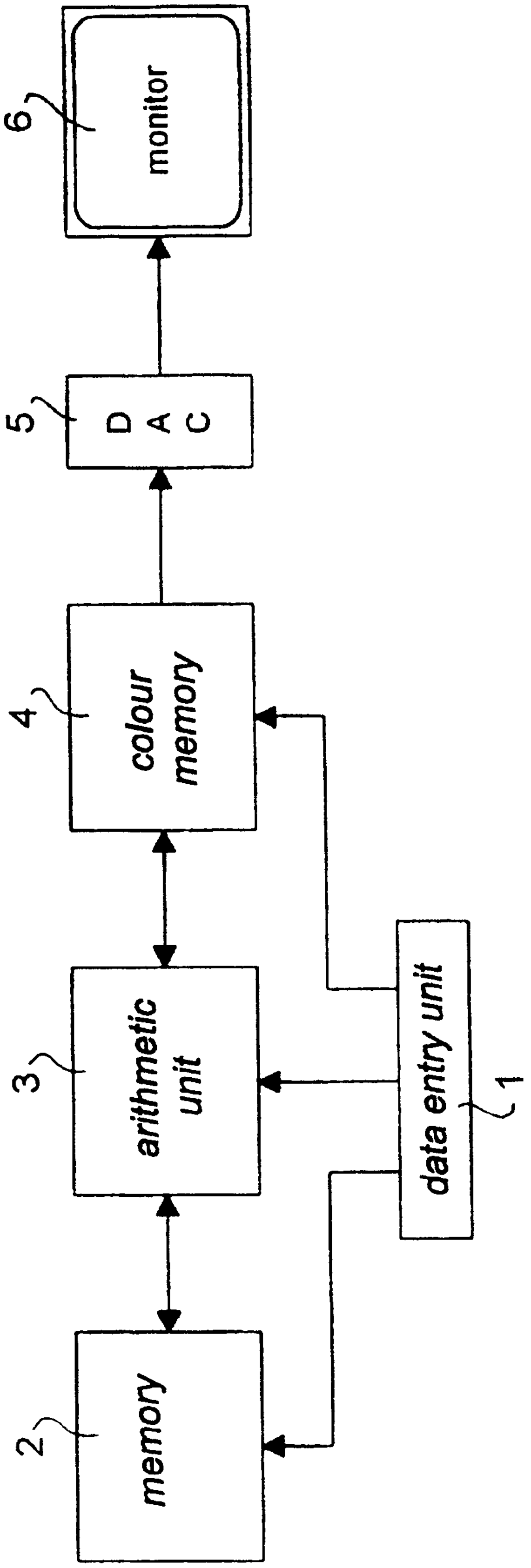
FIG. 1 shows, diagrammatically, equipment for displaying a colour image.
Figure 2:
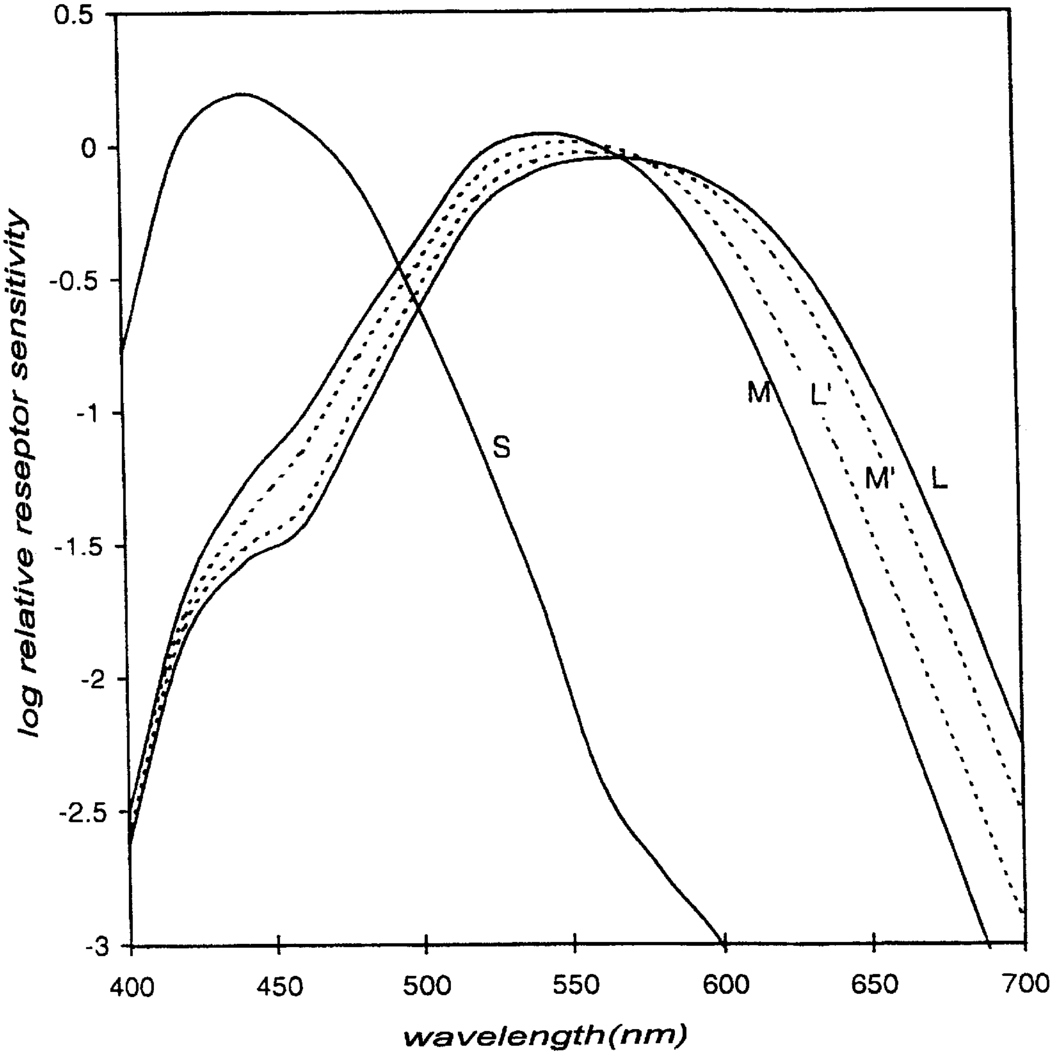
FIG. 2 shows the spectral sensitivity l(λ), m(λ) and s(λ) of the L, M and S receptors, as well as abnormal forms thereof, l'(λ) and m'(λ), which are representative of, respectively, the protanomalous and deuteranomalous form of abnormal colour vision.

FIG. 1 shows, diagrammatically, equipment for displaying colour images on an image display system as well as the method for processing and transforming colours. Data or commands are entered via the data entry unit (1) for processing and/or storage in a memory unit (2), a computing unit (3) and a colour memory unit (4). Digital input signals are fed from the colour memory unit to a digital-to-analog convertor (5). The latter is, for example, a conventional 8-bit DAC. In the example under consideration, each of the three colour guns of a monitor (6) is driven, via said DAC (5), by an analog voltage of between 0 and 1 volt, which is adjusted using a numerical value between 0 and 255 in accordance with the three digital colour specifications of the colours to be generated. In this way $256^3$ different colours can be produced by the combination of the three colour guns.

As is shown in FIG. 1, the computing unit (3) is connected to the data entry unit (1), the memory unit (2) and the colour memory unit (4). Thus, commands which are given via the data entry unit (1) can be executed making use of data from the memory unit (2) and the colour memory unit (4). The data which are fed to the computing unit (3) from the memory unit (2) relate to the colour abnormality data and to the colorimetric data of the image display system, such as the spectral data of the primary colours and the gamma functions, also referred to as the system profile. The data which the computing unit (3) obtains from the colour memory unit (4) relate to that set of colours which belong to the images to be generated on the image display system which is to be transformed. Following the transformation, the new digital colour specifications of the set of colours are fed from the computing unit (3) to the colour memory unit (4).

As is likewise shown in FIG. 1, the data entry unit (1) is connected to the memory unit (2), the computing unit (3) and the colour memory unit (4). Consequently, the commands can be given to the computing unit (3) and the data required for these can also be fed to the memory unit (2) and colour memory unit (4). The commands from the data entry unit (1) to the computing unit (3) relate to the colour transformation to be performed and to computational processing of the transformed colours thus obtained, such as, for example, the calculation of specified colour differences.

When the method according to the invention is used to display a colour image in accordance with the perception of a person who has abnormal colour vision, the three primary physiological colour signals for normal colour vision are calculated in accordance with $$L=k\int L_e(\lambda)l(\lambda)d\lambda$$

$$M=k\int L_e(\lambda)m(\lambda)d\lambda$$

$$S=k\int L_e(\lambda)s(\lambda)d\lambda. \quad (1)$$

In these equations λ is the wavelength in nm and $L_e(\lambda)$ the spectral radiance of the monitor in $W.m^{-2}.sr^{-1}.nm^{-1}$. The functions l(λ), m(λ) and s(λ) represent the spectral sensitivities of the three cones systems. A spectral range of $400\leqq\lambda\leqq700$ and an integration resolution of 2 nm can suffice for the integration. The value of the constant k is of no further significance because this drops out in the subsequent calculations.

Because a colour on the display of the monitor (6) is produced by a combination of the radiances of the red, green and blue primary colours, the radiance of the monitor $L_e(\lambda)$ as a consequence of driving via the DAC (5) with the digital colour specifications $N_R$, $N_G$ and $N_B$ can be described by:

$$L_e(\lambda)=R(\lambda)c_R+G(\lambda)c_G+B(\lambda)c_B. \quad (2)$$

In this equation R(λ), G(λ) and B(λ) are the radiances of, respectively, the red, green and blue primary colours at the maximum input signal of the primary concerned. Said maxima are measured in the absence of driving of the other two primaries. Thus, for R(λ), $N_R$=255 and $N_G$=$N_B$=0. Similarly, for G(λ), $N_G$=255 and $N_R$=$N_B$=0, and for B(λ), $N_B$=255 and $N_R$=$N_G$=0. The variables $c_R$, $c_G$ and $c_B$ represent the relative radiances of the three primary colours, that is to say standardised with respect to the respective maximum radiances R(λ), G(λ) and B(λ). This implies that $c_R$, $c_G$ and $c_B$ vary between 0 and 1.

Figure 3:
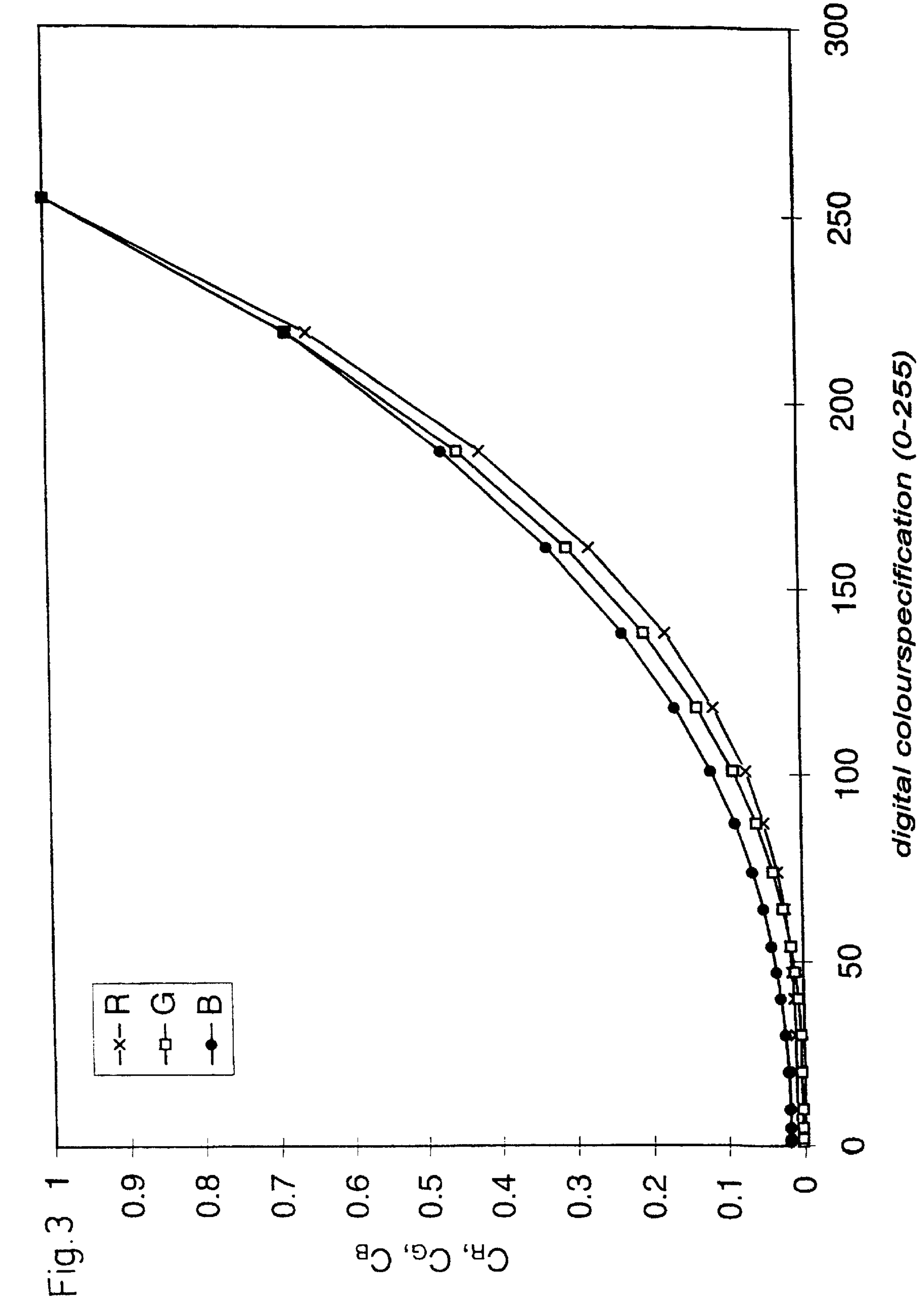
FIG. 3 shows the gamma functions of an image display system, in this case of a Philips Brilliance colour monitor (27-inch screen).

The values of $c_R$, $c_G$ and $c_B$ as a function of the drive signal from the DAC progress in accordance with non-linear functions, the gamma functions which have already been mentioned, an example of which is also shown in FIG. 3 of the drawing. The gamma functions can be determined by calibration of the monitor (6) in accordance with an already known procedure in which the radiance of the primary colours is measured at various digital colour specifications (N). The data thus obtained, in the form of the digital colour specifications $N_R$, $N_G$ and $N_B$, with the relative radiances $c_R$, $c_G$ and $c_B$ corresponding to these, are stored in the memory unit (2). In the event that the calibration data, such as the gamma functions, are not available as given, use is made of already existing standard data.

Following substitution of equation (2) in equation (1) the latter can be rewritten as $$\begin{bmatrix} L \\ M \\ S \end{bmatrix} = k \begin{bmatrix} \int l(\lambda)R(\lambda)d\lambda & \int l(\lambda)G(\lambda)d\lambda & \int l(\lambda)B(\lambda)d\lambda \\ \int m(\lambda)R(\lambda)d\lambda & \int m(\lambda)G(\lambda)d\lambda & \int m(\lambda)B(\lambda)d\lambda \\ \int s(\lambda)R(\lambda)d\lambda & \int s(\lambda)G(\lambda)d\lambda & \int s(\lambda)B(\lambda)d\lambda \end{bmatrix} \begin{bmatrix} c_R \\ c_G \\ c_B \end{bmatrix} \quad (3)$$

or, in generic form, as $$\begin{bmatrix} L \\ M \\ S \end{bmatrix} = k \begin{bmatrix} a_1 & a_2 & a_3 \\ a_4 & a_5 & a_6 \\ a_7 & a_8 & a_9 \end{bmatrix} \begin{bmatrix} c_R \\ c_G \\ c_B \end{bmatrix} \quad (4)$$

or, in abbreviated form, as $$\begin{bmatrix} L \\ M \\ S \end{bmatrix} = k[A] \begin{bmatrix} c_R \\ c_G \\ c_B \end{bmatrix}. \quad (5)$$

Using matrix A it is possible to calculate the corresponding values of L, M and S for each combination of $c_R$, $c_G$ and $c_B$. The converse is also possible, namely via the inverse matrix $A^{-1}$, in accordance with $$\begin{bmatrix} c_R \\ c_G \\ c_B \end{bmatrix} = \frac{1}{k}[A]^{-1} \begin{bmatrix} L \\ M \\ S \end{bmatrix}. \quad (6)$$

Matrix A applies for normal colour vision. With persons who have a form of abnormal colour vision there is question of abnormal primary physiological colour signals, which are designated here by L', M' and S', both for the dichromats and for the anomalous trichromats. For the abnormal colour vision L', M' and S' are calculated in a manner analogous to that for normal colour vision, in accordance with $$\begin{bmatrix} L' \\ M' \\ S' \end{bmatrix} = k[A'] \begin{bmatrix} c_R \\ c_G \\ c_B \end{bmatrix}, \quad (7)$$

where the matrix A', referred to as the deficiency matrix, is determined by the colour abnormality data of the form of abnormal colour vision concerned. Thus, for example, in the case of protanomalopes the deficiency matrix A' is calculated by replacing the spectral sensitivity l(λ) by l'(λ) in equation (3).

The simulation of the abnormal colour vision comes down to generating in a person having normal vision the abnormal primary physiological colour signals L', M', S' which are generated by the stimulus concerned in a person with abnormal colour vision. The relative radiances of the image display system which are required for this are indicated by $c'_R$, $c'_G$ and $c'_B$. Entering these in equation (5) gives $$\begin{bmatrix} L' \\ M' \\ S' \end{bmatrix} = k[A] \begin{bmatrix} c'_R \\ c'_G \\ c'_B \end{bmatrix}. \quad (8)$$

By equating equation (7) and (8) it follows that $$\begin{bmatrix} c'_R \\ c'_G \\ c'_B \end{bmatrix} = [A]^{-1}[A'] \begin{bmatrix} c_R \\ c_G \\ c_B \end{bmatrix}. \quad (9)$$

Given the values of $c_R$, $c_G$ and $c_B$ of a colour, as calculated using equation (9), the relevant luminances of the primary colours are generated by entering the corresponding digital colour specifications $N_R$, $N_G$ and $N_B$, which are contained in the gamma functions of the image display system concerned.

In equation (9) the deficiency matrix A' is calculated using equation (3), after entering the relevant colour abnormality data. For this operation use is made of the schedule of spectral sensitivities for normal and abnormal colour vision shown in Table 1.

TABLE 1

Spectral sensitivities of the L, M and S receptors for normal colour vision and the various forms of abnormal colour vision

| Type of colour vision | Spectral sensitivities: L receptor | M receptor | S receptor |
|---|---|---|---|
| Normal | l(λ) | m(λ) | s(λ) |
| Protanope | **m(λ)** | m(λ) | s(λ) |
| Deuteranope | l(λ) | **l(λ)** | s(λ) |
| Tritanope | l(λ) | m(λ) | **l(λ), m(λ)** |
| Protanomalope | **l'(λ)** | m(λ) | s(λ) |
| Deuteranomalope | l(λ) | m'(λ) | s(λ) |
| Tritanomalope | l(λ) | m(λ) | **l(λ), m(λ), s(λ)** |

In the above schedule the abnormalities from normal colour vision are shown in bold. In this context it is assumed, in line with the generally accepted view, that abnormal colour vision is not associated with a loss of receptors. This means, as can also be seen from the table, that in the case of the protanope the pigment of the L receptors is replaced by the pigment of the M receptors, whilst the converse applies for the deuteranope. In the case of the anomalous trichromats, in the L and M receptors the normal pigments, with spectral sensitivities l(λ) and m(λ), are replaced by pigments with the abnormal spectral sensitivities l'(λ) and m'(λ). Little is known about tritanomaly. For the time being it is assumed that no abnormal pigments are involved here but that there is exclusively replacement of S pigment by L and M pigment, specifically to an equal degree. For the tritanopes this applies for all receptors, resulting in two equal fractions of S receptors, filled with L pigment and M pigment respectively. For the tritanomalopes the abnormality is for the time being described by assuming that a proportion of the S receptors, estimated as ⅓, are still provided with the original S pigment, resulting in an equal contribution by the three different spectral sensitivities l(λ), m(λ) and s(λ) to the colour signal S' of the abnormal S receptor system.

In line with the literature it is assumed that, as in the case of normal colour vision, the primary physiological colour signals in the case of abnormal colour vision are identical to one another in the case of white light, i.e. $L'_w=M'_w=S'_w$. What is concerned here is the so-called 'equal energy' white, which is characterised by a spectral distribution which does not change over the entire visual spectrum.

The change from normal to abnormal colour vision can be calculated for each colour by replacing three of the coefficients $a_1$–$a_9$ in the standard matrix A by the three coefficients which result on replacement of the normal pigment by the pigment of the abnormal receptor system concerned. On the basis of the schedule shown in Table 1, this results in 6 different deficiency matrices, i.e. for the protanope, the protanomalope, the deuteranope, the deuteranomalope, the tritanope and the tritanomalope.

For normal colour vision $$[A]=\begin{bmatrix} a_1 & a_2 & a_3 \\ a_4 & a_5 & a_6 \\ a_7 & a_8 & a_9 \end{bmatrix}. \tag{10}$$

In the case of the protanope the pigment of the L receptor is replaced by that of the M receptor, which results in the deficiency matrix $[A']_P$ in accordance with $$[A']_P=\begin{bmatrix} a_4 & a_5 & a_6 \\ a_4 & a_5 & a_6 \\ a_7 & a_8 & a_9 \end{bmatrix}, \tag{11}$$

with the feature that the normal coefficients $a_1$–$a_3$ have been replaced by the likewise normal coefficients $a_4$–$a_6$.

In the case of the protanomalopes the pigment of the L receptor is replaced by that of the L' receptor, which results in the deficiency matrix $[A']_{Pa}$ in accordance with $$[A']_{Pa}=\begin{bmatrix} a_1' & a_2' & a_3' \\ a_4 & a_5 & a_6 \\ a_7 & a_8 & a_9 \end{bmatrix}, \tag{12}$$

with the feature that the normal coefficients $a_1$–$a_3$ have been replaced by the abnormal coefficients $a'_1$–$a'_3$, as calculated by replacing l(λ) by l'(λ) in equation 3.

In the case of the deuteranope the pigment of the M receptor is replaced by that of the L receptor, which results in the deficiency matrix $[A']_D$ in accordance with $$[A']_D=\begin{bmatrix} a_1 & a_2 & a_3 \\ a_1 & a_2 & a_3 \\ a_7 & a_8 & a_9 \end{bmatrix}, \tag{13}$$

with the feature that the normal coefficients $a_4$–$a_6$ have been replaced by the likewise normal coefficients $a_1$–$a_3$.

In the case of the deuteranomalope the pigment of the M receptor is replaced by that of the M' receptor, which results in the deficiency matrix $[A']_{Da}$ in accordance with $$[A']_{Da}=\begin{bmatrix} a_1 & a_2 & a_3 \\ a_4' & a_5' & a_6' \\ a_7 & a_8 & a_9 \end{bmatrix}, \tag{14}$$

with the feature that the normal coefficients $a_4$–$a_6$ have been replaced by the abnormal coefficients $a'_4$–$a'_6$ as calculated by replacing m(λ) by m'(λ) in equation (3).

For the tritanopes the S receptors are represented by equal numbers of M and L receptors, which results in the deficiency matrix $[A']_T$ in accordance with $$[A']_T=\begin{bmatrix} a_1 & a_2 & a_3 \\ a_4 & a_5 & a_6 \\ 1/2(a_1+a_4) & 1/2(a_2+a_5) & 1/2(a_3+a_6) \end{bmatrix}, \tag{15}$$

with the feature that the normal coefficients $a_7$–$a_9$ have been replaced by the shown combinations of two normal coefficients.

For the tritanomalopes the S receptors are represented by equal numbers of L, M and S receptors, which results in the deficiency matrix $[A']_{Ta}$ in accordance with $$[A']_{Ta}=\begin{bmatrix} a_1 & a_2 & a_3 \\ a_4 & a_5 & a_6 \\ 1/3(a_1+a_4+a_7) & 1/3(a_2+a_5+a_8) & 1/3(a_3+a_6+a_9) \end{bmatrix}, \tag{16}$$

with the feature that the normal coefficients $a_7$–$a_9$ have been replaced by the shown combinations of three normal coefficients.

The values of the coefficients in both the normal matrix A and in the various types of deficiency matrix A' are determined not only by the colour abnormality data but also by the spectral distribution of the primary colours of the image display system. On changing the primary colours of the image display system, all coefficients will thus also have to change.

The possibility of perceiving colours in the same way as these are perceived in the case of abnormal colour vision is utilised to detect the combinations in a given set of colours which are indistinguishable or poorly distinguishable by a person with the particular form of abnormal colour vision. Use is made of standard colorimetric equations to establish a quantitative criterion for the degree to which two colours differ from one another. In these equations use is made of the standardised X Y Z colour specification system from the Commission Internationale d'Eclairage (CIE). Analogously to equation (1) the parameters X, Y and Z, the so-called trichromatic components, can be defined as follows $X=K\int L_e(\lambda)\bar{x}(\lambda)d\lambda$ $Y=K\int L_e(\lambda)\bar{y}(\lambda)d\lambda$ $$Z=K\int L_e(\lambda)\bar{z}(\lambda)d\lambda, \quad (17)$$

where $L_e$ is the spectral radiance of the stimulus concerned and $\bar{x}(\lambda)$, $\bar{y}(\lambda)$ and $\bar{z}(\lambda)$ are the three spectral sensitivity functions of the CIE standard observer, the so-called CIE colorimetric functions. The constant K corresponds to 638 lm/W. The parameter Y, expressed in cd/m$^2$, is used as standard for the brightness (luminance) of a visual stimulus.

To transform a colour stimulus from the LMS domain to the XYZ domain, a transformation from LMS to RGB is first carried out, as described by equation (6), followed by a transformation from RGB to XYZ. This transformation is carried out in a manner analogous to that described previously for the transformation of RGB to LMS, i.e. by replacing the maximum radiances of the primary colours, $r(\lambda)$, $g(\lambda)$ and $b(\lambda)$, in matrix A by the CIE colorimetric functions, $\bar{x}(\lambda)$, $\bar{y}(\lambda)$ and $\bar{z}(\lambda)$, respectively, giving as a result $$\begin{bmatrix} X \\ Y \\ Z \end{bmatrix} = K[B]\begin{bmatrix} c_R \\ c_G \\ c_B \end{bmatrix}, \quad (18)$$

where K is the same constant as in (17) and where matrix B is calculated using $$[B] = \begin{bmatrix} \int r(\lambda)\bar{x}(\lambda)d\lambda & \int g(\lambda)\bar{x}(\lambda)d\lambda & \int b(\lambda)\bar{x}(\lambda)d\lambda \\ \int r(\lambda)\bar{y}(\lambda)d\lambda & \int g(\lambda)\bar{y}(\lambda)d\lambda & \int b(\lambda)\bar{y}(\lambda)d\lambda \\ \int r(\lambda)\bar{z}(\lambda)d\lambda & \int g(\lambda)\bar{z}(\lambda)d\lambda & \int b(\lambda)\bar{z}(\lambda)d\lambda \end{bmatrix}. \quad (19)$$

After specification of the colours in terms of the CIE units X, Y and Z, the latter are then transformed to coordinates of a uniform colour space. In such a space the dimensions X, Y and Z are transformed to dimensions which give a better description in terms of colour perception. In a uniform colour space the distances between colours, as defined in the colour coordinates concerned, are representative of the differences corresponding thereto in the perception of the colours. The CIE defines two such uniform colour spaces, CIELUV and CIELAB. The associated colour difference equations were developed for reflected colours and consequently are not optimum for use with the self-illuminating colours on a monitor. There are also yet further colour difference equations, which are specifically matched to the colours of the monitor, under development. However, there is no generally accepted standard as yet. For the time being, the invention therefore makes use of the CIELUV equation, but also offers the possibility of introducing other equations as well, the variables of which can be derived to transformations of X, Y and Z. Such equations are stored in the memory unit (2).

The parameters used for calculation of colour differences according to the CIELUV system are the associated u' and v' colour coordinates and a parameter L*, which is representative of the relative luminance of the colour stimulus. The colour coordinates u' and v' are defined as follows $$u' = \frac{4X}{X+15Y+3Z} \quad (20)$$

-continued $$v' = \frac{9Y}{X+15Y+3Z}$$

When calculating a colour difference, the colours concerned are first standardised to the brightest colour in the image. For a monitor that is the brightest white, as characterised by the digital colour specifications $N_R=N_G=N_B=255$. The relevant trichromatic components are indicated by $X_n=Y_n=Z_n$, with the colour coordinates corresponding thereto, $u'_n$ and $v'_n$, specified as $$u'_n = \frac{4X_n}{X_n+15Y_n+3Z_n} \quad (21)$$

$$v'_n = \frac{9Y_n}{X_n+15Y_n+3Z_n}$$

According to the CIELUV system, a colour is described as follows $L^*=116(Y/Y_n)^{1/3}-16$ $u^*=13L^*(u'-u_n')$ $$v^*=13L^*(u'-u_n') \quad (22)$$

The difference between two colours, $\Delta E^*_{uv}$, is calculated using $$\Delta E^*_{uv} = \sqrt{(L_1^*-L_2^*)^2+(u_1^*-u_2^*)^2+(v_1^*-v_2^*)^2} \quad (23)$$

This equation is modified for the case where $Y/Y_n \leqq 0.0089$. In this case L* is calculated using $L^*=903.3\ (Y/Y_n)$.

In order to be able to determine which combinations of colours do not meet a preset criterion of $\Delta E^*_{uv}$, the invention has a computer program, to be executed by the computing unit (3), with which this can be investigated. With this program all colour differences which can arise within a specific set of colours are calculated, i.e. ½ ($n^2$−n) combinations for a set of n colours. In the invention this computer program is used on the set of colours which has been transformed from the LMS colour space of normal colour vision to the L'M'S' colour space of the abnormal colour vision. Table 2 shows the result of such a calculation, both before and after the transformation from normal colour vision to abnormal colour vision. The table relates to colours in a colour set of 7 equally bright colours (Y=12 cd/m$^2$).

TABLE 2

Colour differences, $\Delta E^*_{uv}$, within a set of 7 colours of equal brightness ($Y = 12\ cd/m^2$) for normal colour vision (shaded cells) and for the abnormal colour vision as occurs in the case of protanomaly, respectively. The numerals printed in bold relate to colour differences for which $\Delta E^*_{uv} \leqq 30$. The XYZ specifications of the colours are given in the first row

| Colours | White<br>X = 11.41<br>Y = 12.00<br>Z = 13.06 | Red<br>X = 15.09<br>Y = 12.00<br>Z = 9.27 | Green<br>X = 8.69<br>Y = 12.00<br>Z = 7.08 | Blue<br>X = 12.89<br>Y = 12.00<br>Z = 24.89 | Yellow<br>X = 10.70<br>Y = 12.00<br>Z = 3.39 | Magenta<br>X = 14.53<br>Y = 12.00<br>Z = 20.34 | Cyan<br>X = 8.84<br>Y = 12.00<br>Z = 0.14 |
|---|---|---|---|---|---|---|---|
| White | x | 49.2 | 37.6 | 66.7 | 38.0 | 53.4 | 50.6 |
| Red | 14.4 | x | 72.6 | 92.3 | 54.3 | 58.0 | 99.1 |
| Green | 29.7 | 32.0 | x | 98.4 | 26.3 | 90.6 | 56.6 |
| Blue | 66.1 | 73.4 | 93.5 | x | 101.2 | 39.3 | 62.8 |
| Yellow | 36.5 | 35.0 | 13.6 | 98.8 | x | 84.7 | 74.3 |
| Magenta | 51.0 | 56.6 | 79.7 | 18.3 | 84.5 | x | 79.1 |
| Cyan | 25.3 | 38.5 | 47.9 | 48.0 | 55.9 | 38.0 | x |

In the invention colours which do not meet the desired $\Delta E^*_{uv}$ criterion are detected automatically. This is shown in Table 2 for the criterion $\Delta E^*_{uv} \leqq 30$. The colour combinations concerned are printed in bold, from which it can be seen that whereas in the case of normal colour vision (shaded cells) there is question only of one combination which does not meet the criterion, there is question of five such combinations in the case of abnormal colour vision.

In order still to be able to achieve compliance in those cases in which the required difference criterion is not met, new digital colour specifications can be provided using the data entry unit (1) and the effect thereof rendered visible via the image display system. If necessary this process can be repeated until there is compliance with the set difference criterion. With this method of colour adaptation to the requirements of the user with abnormal colour vision, use can also be made of assistance from a computational method. Such a method is also implemented in the invention. With this method the colour combinations which do not comply with a preset difference criterion are detected and the distance between the colours concerned is then increased until the required criterion is met. To this end the distance is maximised in the projected u*,v* plane of the CIELUV colour space, followed, if necessary, by a further enlargement of the colour difference by means of enlarging the difference along the L* axis. After the result from the expert system has been rendered visible, this can optionally also be further processed by manual input of new digital colour specifications.

What is claimed is:

1. Method for displaying a colour image using an image display system comprising an image plane with pixels, a data entry unit, connected to the image display system, for input by a user of digital colour specifications and calibration data to a colour memory unit and memory unit, and a computing unit, connected to the data entry unit, for the transformation and processing of the digital colour specifications, as a function of colour abnormality data and colour processing commands selected by the user, comprising the following steps:

a) feeding of the digital colour specifications of the colour or set of colours to be transformed and of the colour abnormality and system data required for the transformation into the computing unit, b) calculation, with the aid of the computing unit, of three primary physiological colour signals for an observer with normal colour vision, c) calculation of a second set of three primary physiological colour signals for an observer with abnormal colour vision, as specified by the colour abnormality data, d) calculation of three new digital colour specifications for generation of colours which generate the same primary physiological colour signals for an observer with normal colour vision as the colour signals calculated under c) for an observer with abnormal color vision, e) calculation of trichromatic components X, Y and Z in the CIE colour specification system which correspond to the new digital colour specifications, f) assessment of the degree of colour difference in pairs of colours within the set of transformed colours, making use of calculations in accordance with predetermined colour difference equations, g) selecting those color differences from the colour differences calculated under f) which do not meet a pre-set difference criterion and then modifying the colours concerned, optionally with the assistance of a computational method, such that said colours then comply with the set difference criterion, prior to carrying out step a, the colorimetric data required for calculation of the radiances of the primary colours have been collected and stored in a memory unit connected to the computing unit, wherein the colorimetric data of the image display system, also referred to as the profile of the system, are obtained by measuring the spectral distribution of the primary colours of the image display system and the relevant gamma functions, which indicate the relationship between digital input signals and relative radiances of the primary colours.

2. Method according to claim 1, wherein in step b the first three primary physiological colour signals are calculated using $$L=k\int L_e(\lambda)l(\lambda)d\lambda$$

$$M=k\int L_e(\lambda)m(\lambda)d\lambda$$

$$S=k\int L_e(\lambda)s(\lambda)d\lambda,$$

where:

$L_e(\lambda)$ is the radiance of the pixel in $W.m^{-2}.sr^{-1}.nm^{-1}$, $l(\lambda)$, $m(\lambda)$ and $s(\lambda)$ represent the spectral sensitivity of the three receptor systems, k is a constant which subsequently drops out in the calculations and $\lambda$ is the wavelength, which can vary between 400 and 800 nm.

3. Method according to claim 2, wherein the physiological primary colours L, M and S are calculated using $$\begin{bmatrix} L \\ M \\ S \end{bmatrix} = k[A]\begin{bmatrix} c_R \\ c_G \\ c_B \end{bmatrix},$$

where [A] consists of 9 coefficients, defined as $$[A] = \begin{bmatrix} a_1 & a_2 & a_3 \\ a_4 & a_5 & a_6 \\ a_7 & a_8 & a_9 \end{bmatrix} \quad (26)$$

and $a_1$–$a_9$ are calculated using $$[A] = \begin{bmatrix} \int l(\lambda)R(\lambda)d\lambda & \int l(\lambda)G(\lambda)d\lambda & \int l(\lambda)B(\lambda)d\lambda \\ \int m(\lambda)R(\lambda)d\lambda & \int m(\lambda)G(\lambda)d\lambda & \int m(\lambda)B(\lambda)d\lambda \\ \int s(\lambda)R(\lambda)d\lambda & \int s(\lambda)G(\lambda)d\lambda & \int s(\lambda)B(\lambda)d\lambda \end{bmatrix},$$

where $R(\lambda)$, $G(\lambda)$ and $B(\lambda)$ represent the maximum radiances of the primary colours of the image display system.

4. Method according to claim 3, wherein step c comprises the calculation of the physiological primary colours L', M' and S' for a person with abnormal colour vision, in accordance with $$\begin{bmatrix} L' \\ M' \\ S' \end{bmatrix} = k[A']\begin{bmatrix} c_R \\ c_G \\ c_B \end{bmatrix},$$

where the matrix A', referred to as the deficiency matrix, is determined by the colour abnormality data for the particular form of abnormal colour vision and accordingly can assume the following forms:

$$[A']_P = \begin{bmatrix} a_4 & a_5 & a_6 \\ a_4 & a_5 & a_6 \\ a_7 & a_8 & a_9 \end{bmatrix},$$

with the feature that the normal coefficients $a_1$–$a_3$ have been replaced by the likewise normal coefficients $a_4$–$a_6$, $$[A']_{Pa} = \begin{bmatrix} a_1' & a_2' & a_3' \\ a_4 & a_5 & a_6 \\ a_7 & a_8 & a_9 \end{bmatrix},$$

with the feature that the normal coefficients $a_1$–$a_3$ have been replaced by the abnormal coefficients $a'_1$–$a'_3$, as calculated by replacing $l(\lambda)$ by $l'(\lambda)$ in matrix [A], $$[A']_D = \begin{bmatrix} a_1 & a_2 & a_3 \\ a_1 & a_2 & a_3 \\ a_7 & a_8 & a_9 \end{bmatrix},$$

with the feature that the normal coefficients $a_4$–$a_6$ have been replaced by the likewise normal coefficients $a_1$–$a_3$, $$[A']_{Da} = \begin{bmatrix} a_1 & a_2 & a_3 \\ a_4' & a_5' & a_6' \\ a_7 & a_8 & a_9 \end{bmatrix},$$

with the feature that the normal coefficients $a_4$–$a_6$ have been replaced by the abnormal coefficients $a'_4$–$a'_6$, as calculated by replacing $m(\lambda)$ by $m'(\lambda)$ in matrix [A], $$[A']_T = \begin{bmatrix} a_1 & a_2 & a_3 \\ a_4 & a_5 & a_6 \\ 1/2(a_1+a_4) & 1/2(a_2+a_5) & 1/2(a_3+a_6) \end{bmatrix},$$

with the feature that the normal coefficients $a_7$–$a_9$ have been replaced by the shown combinations of two, likewise normal coefficients, $$[A']_{Ta} = \begin{bmatrix} a_1 & a_2 & a_3 \\ a_4 & a_5 & a_6 \\ 1/3(a_1+a_4+a_7) & 1/3(a_2+a_5+a_8) & 1/3(a_3+a_6+a_9) \end{bmatrix},$$

with the feature that the normal coefficients $a_7$–$a_9$ have been replaced by the shown combinations of three, likewise normal coefficients.

5. Method according to claim 4, wherein step d comprises calculation of the values of the primary colours $c'_R$, $c'_G$ and $c'_B$ in accordance with $$\begin{bmatrix} c_R' \\ c_G' \\ c_B' \end{bmatrix} = [A]^{-1}[A']\begin{bmatrix} c_R \\ c_G \\ c_B \end{bmatrix},$$

where A' is calculated with reference to claim 5.

6. Method according to claim 5, wherein step e comprises calculation of the matrix B, which applies for the transformation of XYZ to the RGB domain in accordance with $$\begin{bmatrix} X \\ Y \\ Z \end{bmatrix} = K[B] \begin{bmatrix} c_R \\ c_G \\ c_B \end{bmatrix},$$

where the constant K corresponds to 683 lm/W and matrix B is calculated using $$[B] = \begin{bmatrix} \int r(\lambda)\overline{x}(\lambda)d\lambda & \int g(\lambda)\overline{x}(\lambda)d\lambda & \int b(\lambda)\overline{x}(\lambda)d\lambda \\ \int r(\lambda)\overline{y}(\lambda)d\lambda & \int g(\lambda)\overline{y}(\lambda)d\lambda & \int b(\lambda)\overline{y}(\lambda)d\lambda \\ \int r(\lambda)\overline{z}(\lambda)d\lambda & \int g(\lambda)\overline{z}(\lambda)d\lambda & \int b(\lambda)\overline{z}(\lambda)d\lambda \end{bmatrix},$$

where $\overline{x}(\lambda)$, $\overline{y}(\lambda)$ and $\overline{z}(\lambda)$ are the CIE colorimetric functions.

7. A Method according to claim 6, wherein step f comprises calculation of colour differences of all combinations of two colours within the transformed colour set, making use of an arbitrary colour difference equation, such as, for example, the equation according to the CIELUV system, with which the colour difference $\Delta E^*_{uv}$ is calculated in accordance with $$\Delta E^*_{uv} = \sqrt{(L^*_1 - L^*_2)^2 + (u^*_1 - u^*_2)^2 + (v^*_1 - v^*_2)^2},$$

where $$L^* = 116(Y/Y_n)^{1/3} - 16$$

$$u^* = 13L^*(u' - u'_n)$$

$$v^* = 13L^*(u' - u'_n)$$

$$u' = \frac{4X}{X + 15Y + 3Z}$$

$$v' = \frac{9X}{X + 15Y + 3Z}$$

$$u'_n = \frac{4X_n}{X_n + 15Y_n + 3Z_n}$$

$$v'_n = \frac{9Y_n}{X_n + 15Y_n + 3Z_n},$$

where X, Y, Z are the CIE trichromatic components, subscripts 1 and 2 relate to two different colours and subscript n relates to the brightest colour white of the image display system.

8. Method according to claim 7, wherein step g comprises registering the colour differences which do not comply with a criterion set by the user and then changing the colours concerned such that these do comply with the set criterion, either manually, in interaction with the user, or automatically, on the basis of a computational method.

9. Equipment for carrying out the method according to claim 1, comprising a memory unit (2), a computing unit (3) and a colour memory unit (4) as well as a data entry unit (1).

10. Method for displaying a colour image using an image display system comprising an image plane with pixels, a data entry unit, connected to the image display system, for input by a user of digital colour specifications and calibration data to a colour memory unit and memory unit, and a computing unit, connected to the data entry unit, for the transformation and processing of the digital colour specifications, as a function of colour abnormality data and colour processing commands selected by the user, comprising the following steps:

a) feeding of the digital colour specification $N_R$, $N_G$ or $N_B$ of the colour of set of colours to be transformed and of the colour abnormality and system data required for the transmission into the computing unit;

b) determining with the aid of the computing and/or memory unit, the coefficients [A] of a first set of three primary physiological colour signals L, M, S for an observer with normal colour vision;

c) determining of the coefficients [A'] of a second set of three primary physiological colour signals L',M',S' abnormality data;

d) calculation of three new digital colour specifications $N_R$,$N_G$ or $N_B$ for generation of colours which generate the same primary physiological colour signals L',M',S' for an observer with normal colour vision as the second set of primary physiological using the coefficient [A], [A'], determined under steps a. and b., colour signals under c. for an observer with abnormal colour vision;

e) calculation of trichromatic components X, Y and Z in the CIE colour specification system which correspond to the new digital colour specifications;

f) assessment of the degree of colour difference in pairs of colours within the set of transformed colours, making use of calculations in accordance with predetermined colour difference equations; and g) selecting those colour differences from the colour differences calculating under f. which do not meet a pre-set difference criterion and then modifying the colours concerned, optionally with the assistance of a computational method, such that said colours then comply with the set difference criterion.

11. Method according to claim 10, characterized in that, prior to carrying out step a, the colorimetric data required for calculation of the radiances of the primary colours have been collected and stored in a memory unit connected to the computing unit.

12. Method according to claim 10, wherein the colorimetric data of the image display system, also referred to as the profile of the system, are obtained by measuring the spectral distribution of the primary colours of the image display system and the relevant gamma functions, which indicate the relationship between digital input signals and relative radiances of the primary colours.

13. Equipment for carrying out the method according to claim 10, comprising a memory unit (2), a computing unit (3) and a colour memory unit (4) as well as a data entry unit (1).

* * * * *